United States Patent [19]

Chemla

[11] Patent Number: 4,549,788
[45] Date of Patent: Oct. 29, 1985

[54] INTENSITY OF A LIGHT BEAM APPLIED TO A LAYERED SEMICONDUCTOR STRUCTURE CONTROLS THE BEAM

[75] Inventor: Daniel S. Chemla, Rumson, N.J.

[73] Assignee: AT&T Bell Laboratories, Murray Hill, N.J.

[21] Appl. No.: 455,461

[22] Filed: Jan. 3, 1983

[51] Int. Cl.$^4$ ............................ G02F 1/29; G02F 1/35
[52] U.S. Cl. .................................. 350/354; 350/363; 350/386; 350/393
[58] Field of Search .................. 350/96.14, 353–354, 350/356, 363, 381, 386, 393; 358/213, 241; 307/430

[56] References Cited

U.S. PATENT DOCUMENTS 3,746,879  7/1973  Esaki et al. ........................ 350/389
4,190,811  2/1980  Alcock et al. ....................... 372/25

OTHER PUBLICATIONS

Gibbs et al., "Room–Temperature Excitonic Optical Bistability in a GaAs–GaAlAs Superlattice Etalon", Applied Physics Lett., 8-1-1982, pp. 221–222.
Smith et al., "Bistable Optical Devices Promise Subpicosecond Switching", IEEE Spectrum 6-1981, pp. 26–31.
Reinhart et al., "Efficient GaAs–Al$_x$Ga$_{1-x}$As Double–Heterstructure Light Modulators", App. Phys. Lett., 1-1972, pp. 36–38.
Kaplan, A. E., "Theory of Hysteresis Reflection & Refraction of Light by a Boundry of a Nonlinear Medium", Sov. Phys., JETP 45(5) 5-1977, pp. 896–905.
Miller et al., "Large Room-Temperature Optical Nonlinearity in GaAs/Ga$_{1-4}$Al$_4$As Multiple Quantum Well Structures", App. Phys. Lett. 41(8) 10-1982, pp. 679–681.
Van Der Ziel et al., "Laser Oscillation from Quantum States in Very Thin GaAs–Al$_{0.2}$Ga$_{0.8}$s Multilayer Structures", App. Phys. Lett. 4-1975, pp. 463–465.
Gibbs et al., "Optical Bistability in Semiconductors", App. Phys. Letts., 9-1979, pp. 451–453.
Streifer et al., "Optical Analysis of Multiple-Quantum-Well Lasers", App. Optics, 11-1979, pp. 3547–3548.
Smith et al., "Experimental Studies of a nonlinear Interface", IEEE Jr. of Quantum Electronics, vol. 17, 3-1981, pp. 340–348.

Primary Examiner—William H. Punter
Attorney, Agent, or Firm—Richard B. Havill

[57] ABSTRACT

An optical device includes a layered semiconductor structure having a variable input light beam applied to the structure with an E field component polarized normal to the layers. Intensity of the input light beam controls charge trapped in the layers, the dielectric constant of the layers containing the trapped charge, and the propagation of the input light beam within the device.

10 Claims, 9 Drawing Figures

INTENSITY OF A LIGHT BEAM APPLIED TO A LAYERED SEMICONDUCTOR STRUCTURE CONTROLS THE BEAM

The invention relates to an arrangement for controlling a beam of light and more particularly to an arrangement including a layered semiconductor structure for controlling an input beam by varying the intensity of the beam.

BACKGROUND OF THE INVENTION

In the prior art, it is known that the intensity of a light beam applied to certain materials can control the dielectric constant, the refractive index and the absorption coefficient of the material. Such changes affect the propagation of the light beam within the material. Such materials are called nonlinear optical materials. In various arrangements, gases, liquids, and solids have been used as nonlinear optical materials.

The theory of reflection and refraction at a nonlinear interface has been discussed by A. E. Kaplan in *Soviet Physics JETP* 45(5) May 1977. Translation by American Institute of Physics, pages 896–905.

It is desirable to develop an integrated solid-state optical device wherein the intensity of a light beam applied to the device controls the propagation of that beam through the device. In *IEEE Spectrum*, June 1981, pages 26–33, P. W. Smith and W. J. Tomlinson describe examples of solid materials wherein the propagation of a light beam through the material is controlled by intensity of the beam. A problem in developing an integrated solid-state optical device is that none of the prior art materials is suitable for developing such an integrated optical device for operation at room temperature.

SUMMARY OF THE INVENTION

This problem is solved by an optical device including a layered semiconductor structure having a variable input light beam applied to the structure with an E field component polarized normal to the layers. Intensity of the input light beam controls charge trapped in the layers, the dielectric constant of the layers containing the trapped charge, and the propagation of the input light beam within the device.

BRIEF DESCRIPTION OF THE DRAWINGS

A better understanding of the invention may be derived from the detailed description following if that description is read with reference to the attached drawings wherein.

DETAILED DESCRIPTION

Figure 1:
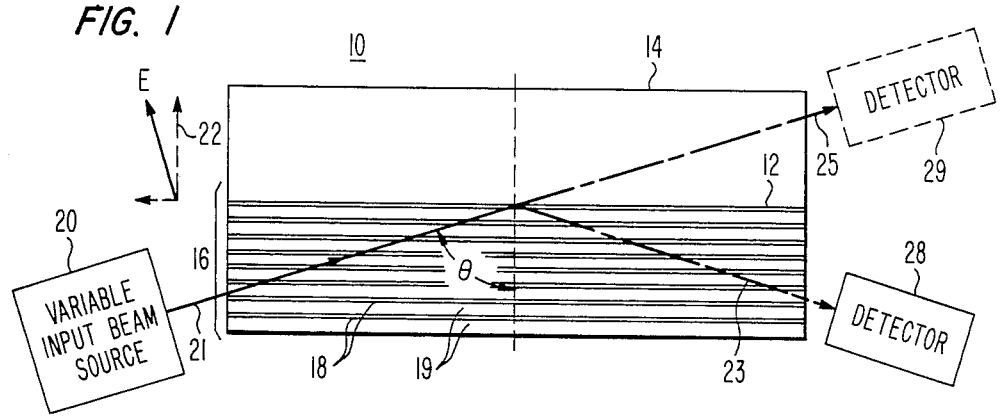
FIG. 1 is a schematic diagram of an optical device embodying the invention.

Referring now to FIG. 1, an optical device 10 is a nonlinear switching arrangement including an optical interface 12 between a linear optical material 14 and a nonlinear optical material 16. The linear optical material 14 is a solid substrate material, such as a semiconductor material. $Ga_{1-x}Al_xAs$ is an alloy system from which a suitable linear optical material can be selected. The linear optical material 14 has an index of refraction $n_o$. The nonlinear optical material 16 is a layered semiconductor structure containing alternate layers of small energy band gap material 18 and a large energy band gap material 19. The layers of materials are lattice matched with the substrate. One type of layered semiconductor material is a multiple quantum well structure that includes layers of GaAs as the material 18 and layers of $Ga_{1-x}Al_xAs$ as the material 19. The nonlinear optical material has an intensity dependent refractive index $n = n_1 + n_2 I$ that produces an optical Kerr effect. In this expression, I is the intensity of the input beam, $n_1$ is the zero-intensity refractive index, and $n_2$ is the optical Kerr coefficient. With this system of materials, the device 10 operates effectively in a wavelength range above 0.85 micrometers. The refractive index $n_o$ of the linear optical material is less than the zero-intensity refractive index $n_1$ of the nonlinear optical material by a small amount. The optical Kerr coefficient $n_2$ has a negative sign.

Another type of suitable layered semiconductor material is called a superlattice structure. It is a special case of the just described multiple quantum well structure wherein the layers are periodic with a period of the order of a few hundred Angstroms.

Whether the general multiple quantum well structure or the superlattice structure is used, the structure is designed for trapping a predetermined quantity of charge in the layers of small energy band gap material 18. The layers 18 are extrinsic semiconductor layers, such as GaAs, illustratively doped with n-type carriers leaving a predetermined quantity of trapped charge in those layers 18 while the material is not energized externally. A wave function of the trapped charge in the layers 18 is an oscillating sine waveform. An intrinsic semiconductor, such as $Ga_{1-x}Al_xAs$, is formed into the layers of large energy band gap material 19 which are thick enough so that the trapped charge in any layer 18 is isolated from the charge in every other layer 18. Any trapped charge which spreads into the layers 19, decreases exponentially therein. The trapped charge penetrates into the layers 19 on the order of 10 to 20 angstroms. With the layers 19 being 5–10 times thicker than the penetration of the trapped charge, each layer 18 operates as an independent square well.

In FIG. 1 a variable input beam source 20 of monochromatic light produces a polarized light beam 21 that is applied to the optical device 10. This input light beam is directed through the layered nonlinear optical material to the optical interface 12 between the nonlinear optical material 16 and the linear optical material 14. The input light beam 21 is directed along an axis which is positioned at an angle of incidence $\theta$ that is greater than the critical angle of incidence for low intensity light and is less than the critical angle of incidence for high intensity light. As shown in FIG. 1, the input light beam 21 has an E field component 22 that is polarized normal to the layers of the multiple quantum well structure for reasons to be presented subsequently. The source 20 is arranged to vary the intensity I of the input light beam 21.

The reflectivity of the interface 12 is intensity dependent. The source of light 20 produces a beam of light having an intensity which can be varied through a range of intensities. For intensities below a critical intensity $I_c$ of the input light beam 21, an effective critical angle of incidence is greater than the angle of incidence $\theta$ and the beam is totally internally reflected at the interface. The reflected beam 23 is reflected from the interface through the layered nonlinear optical material 16 to an optical detector 28. No beam is transmitted through the linear material 14.

As the intensity of the input light beam is increased, the refractive index of the multiple quantum well structure decreases. Because of the negative Kerr coefficient $n_2$ of the layered nonlinear optical material, the index of refraction difference across the interface 12 is reduced thus reducing the effective critical angle. At the critical input beam intensity $I_c$, the effective critical angle equals the angle of incidence $\theta$. The total internal reflection switches to nearly total transmission of the input beam through the interface 12 into and through the linear optical material 14. For input beam intensities greater than the critical intensity $I_c$, the effective critical angle is less than the angle of incidence $\theta$ and the beam traverses the multiple quantum well structure and the optical interface 12. Then the transmitted output beam 25 is transmitted through the linear optical material 14 away from the detector 28.

Figure 2:
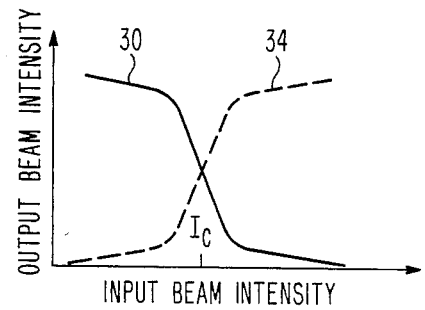
FIG. 2 is a characteristic curve for the device of FIG. 1.

Referring now to FIG. 2, there is shown an operating characteristic for the device 10 in accordance with the foregoing description. The detector 28 of FIG. 1 determines whether the intensity of the input light beam is above or below the critical intensity $I_c$. As shown by the solid curve 30 in FIG. 2, for input beam intensities below the critical intensity $I_c$, the detector receives most of the light from the input beam and indicates a high output beam intensity. When the input beam intensity is approximately equal to the critical intensity $I_c$, the output beam applied to the detector has a rapidly falling intensity. For input beam intensities above the critical intensity $I_c$, the output beam applied to the detector is a low intensity.

The dotted curve 34 in FIG. 2 represents the operating characteristic of the arrangement of FIG. 1 when the detector is positioned in an alternate position shown by a dotted detector 29.

Figure 3:
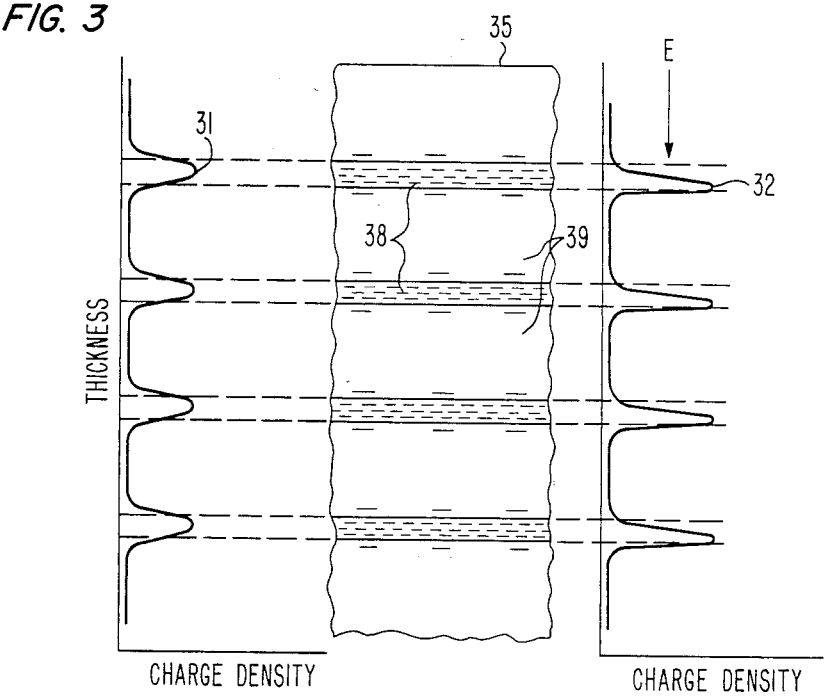
FIG. 3 is a cross-section of a layered structure together with two different charge density function curves that occur under certain operating conditions.

Referring now to FIG. 3, there are shown a pair of charge distribution curves 31 and 32 which are associated with a layered structure 35 like the layered structure 16 of FIG. 1. The layered structure 35 contains trapped charge which is shown illustratively as minus signs in the layered structure. As shown the charge is concentrated within layers of small energy band gap material 38. Some of this charge penetrates slightly into layers of large energy band gap material 39. Although FIG. 3 shows only negative charge, a device similar to device 10 can be made and operated with positive trapped charge.

When the layered material of FIG. 3 is not energized, for instance when a zero-intensity input beam is applied thereto, the density of the charge in the layers is distributed symmetrically, as shown by the curve 31. Most of the charge is trapped in the layers 38, as shown by the peaks in curve 31 and by the density of minus signs in the layers 38 of the structure 35. A small portion spills over into the adjacent regions of the layers 39, as shown in the lower portions of the peaks in curve 31 and by the scattered minus signs in the layers 39 of the structure 35. The semiconductor layers 39 are thick enough to isolate the charge of each separate layer 38. Thus the charge is trapped in the layers of small energy band gap material 38.

Application of the input light beam, such as the beam 21 in FIG. 1 with a component of its E field polarized normal to the layers, changes the profile of the trapped charge, as shown by the curve 32 in FIG. 3. The presence of the E field normal to the layers forces the trapped charge into a nonsymmetrical density profile. Total charge remains unchanged in the layers 38 because the charge in each of those layers effectively is isolated from the charge in the other layers 38. The change in charge distribution caused by the E field is confined to each separate semiconductor layer 38. The change of the charge density profile is a change of the spatial distribution of the trapped charge which causes a change in the dielectric constant of the layered structure and the refractive index of the layered structure, as described previously. The resulting increased charge density decreases the effective refractive index $n = n_1 + n_2 I$ of the layered nonlinear optical materials 16 of FIG. 1 and 35 of FIG. 3.

As a result of the change of the dielectric constant and the refractive index n with the intensity of the input light beam, the optical device either nearly totally reflects the input beam to the detector 28 or else transmits most of it through the linear material away from the detector. Thus control of the incident light beam at the interface between the layered semiconductor structure and the linear material is dependent upon the intensity of the input beam itself.

For purposes of simplifying computations relating to the optical nonlinearity, assume that for a zero-intensity input beam the trapped charge is distributed uniformly across each of the layers 18 in FIG. 1. As a result of this assumption, the linear density of charge across each layer is $\sigma = N_e^{\frac{1}{3}}$. The number of electrons in an elementary tube across such a layer 18 is $N = \sigma d_1 = N_e^{\frac{1}{3}} d_1$, where $d_1$ is the thickness of the layer 18.

Consider the hyperpolarizability of the elementary tube. According to Rustagi and Ducuing, *Optical Communications*, No. 10, p. 258, March 1974, the nonlinear change of refractive index $$\gamma = \frac{256}{45\pi^6} \cdot \frac{1}{a^3 e^2} \cdot \frac{(1/2d_1)^{10}}{(1/2N)^5},$$

where a is the Bohr radius in the layer 18. For GaAs, a equals approximately 8 angstroms.

The nonlinearity of the layers 18 is $x^{(3)}$, where $x^{(3)} = K\gamma$. K is the number of elementary tubes per unit volume. K also equals the number of elementary tubes per unit of surface times the number of layers 19 per unit of length. Thus $$K = \frac{(N_e)^{2/3}}{(d_1 + d_2)},$$

where $d_2$ is the thickness of the layer 19.

$$x^{(3)} = K\gamma = \frac{N_e^{2/3}}{d_1 + d_2} \cdot \frac{256}{45\pi^6} \cdot \frac{1}{a^3 e^2} \cdot \frac{(1/2d_1)^{10}}{(1/2d_1)^5 N_e^{5/3}}$$

-continued $$= \frac{256}{45\pi^6} \cdot \frac{1}{a^3 e^2} \cdot \frac{(1/2d_1)^5}{(d_1 + d_2)N_e}.$$

$N_e$ typically has a value in the range from $10^{17}$ to $3\times10^{17}$. With a value for $N_e$ selected within that range, the device 10 of FIG. 1 would have a nonlinearity $x^{(3)}$ in a range between $2\times10^{-4}$esu and $8\times10^{-5}$esu.

Because the operative phenomenon is a dynamic movement of the trapped charge in response to changes of intensity of the input beam of light, the speed of operation potentially is very high.

Figure 4:
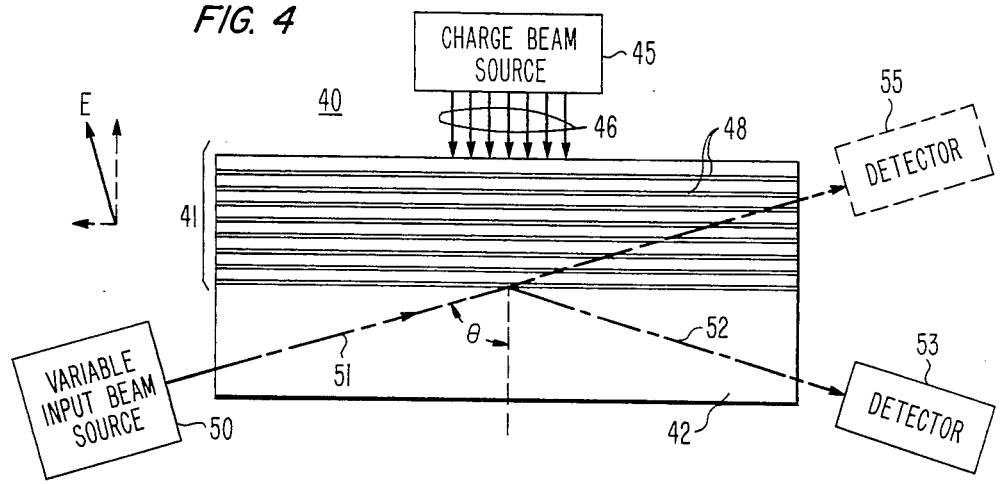
FIG. 4 is a schematic diagram of another optical device embodying the invention.

Referring now to FIG. 4, there is shown another optical device 40 embodying the invention. A layered nonlinear optical material 41, such as a multiple quantum well structure, forms an optical interface with a linear optical material 42 similar to the arrangement of FIG. 1 except that charge is not doped into the layers of small energy band gap material 48 of the layered nonlinear optical material 41. Instead a light source 45 produces a charge energizing beam 46 which is directed into the layered structure where it is absorbed for creating charge in the layers 48. As long as the beam 46 is applied, the charge is trapped in those layers 48.

Figure 5:
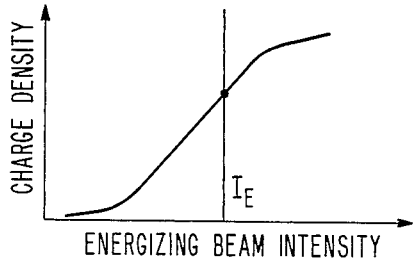
FIGS. 5, 6 and 7 are a group of operating characteristic curves for the device of FIG. 4.

FIG. 5 shows a plot of the charge density in the layers 48 in response to the intensity of the charge energizing beam 46. Intensity $I_E$ of the charge energizing beam 46 and the refractive index $n_o$ of the linear material are selected so that the refractive index $n_o$ of the linear material 42 is slightly larger than the refractive index $n=n_1+n_2I$ of the layered nonlinear optical material.

Figure 6:
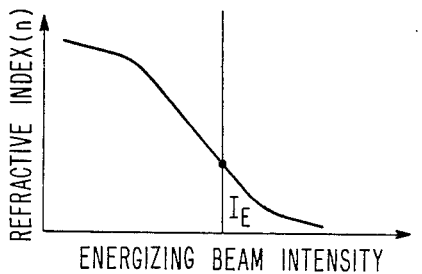

As shown in FIGS. 5 and 6, charge density increases and the nonlinear refractive index $n=n_1+n_2I$ of the layered material decreases in dependence upon the intensity of the charge beam. The intensity $I_E$ shown in FIGS. 5 and 6 is held constant after the operating point is selected.

A variable input beam light source 50 produces a monochromatic light beam 51 which is applied to the optical interface between the linear and nonlinear optical materials at an angle of incidence $\theta$ which is larger than the effective critical angle for high intensity beams and smaller than the effective critical angle for low intensity beams. For low intensities of the input beam 51, the input beam 51 traverses the optical interface and is transmitted on through the layered nonlinear optical material 41 away from a detector 53. As the intensity of the input beam 51 is varied from a low value to a high value, the dielectric constant and the refractive index n of the layered material change as a result of the optical Kerr effect. At a critical intensity $I_c$ of the input beam, the effective critical angle of the input beam equals the angle of incidence $\theta$ and the nearly total transmission switches to internal reflection. For high intensities of the input light beam, the effective critical angle is larger than the angle of incidence $\theta$ and the beam 51 is entirely internally reflected along a path 52 to the optical detector 53.

Figure 7:
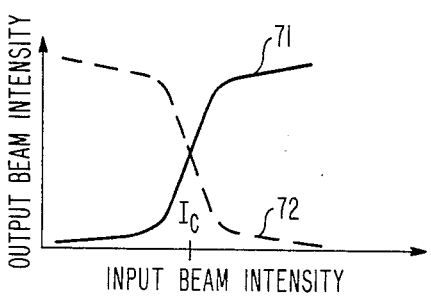

Referring now to FIG. 7, there is shown an operating characteristic for the device 40 of FIG. 4. In FIG. 7 the solid curve 71 represents the operating function when the detector 53 is positioned as shown in FIG. 4. The dotted characteristic curve 72 also shown in FIG. 7, represents the characteristic curve which is applicable to the arrangement of FIG. 4 with the detector positioned, as shown by an alternative detector 55 that is dotted in FIG. 4.

The charge beam source 45 is shown in FIG. 4 as applying the charge energizing beam 46 incident upon the upper surface of the layered material. In an alternative arrangement, the charge beam source 45 can be positioned to apply the charge energizing beam to the lower surface of the linear material so long as the beam penetrates to the layered material for generating the desired trapped charge. In the previously mentioned material system, the charge energizing beam has a wavelength in a range of 0.6–0.9 micrometers.

Figure 8:
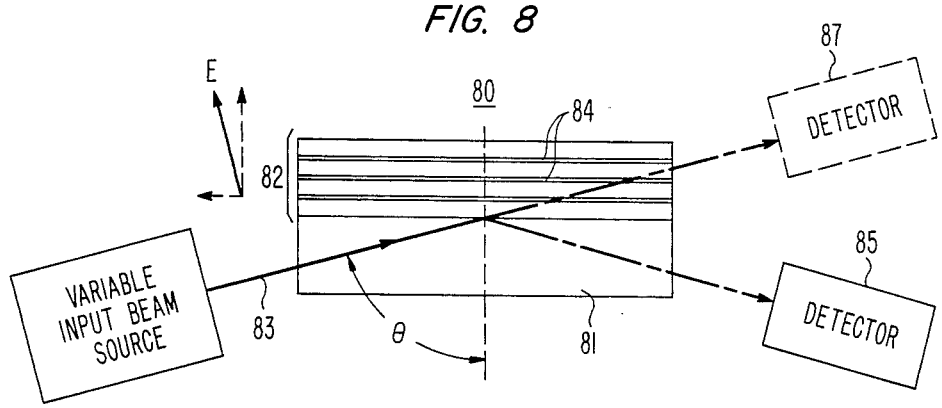
FIG. 8 is a schematic diagram of still another optical device embodying the invention.
Figure 9:
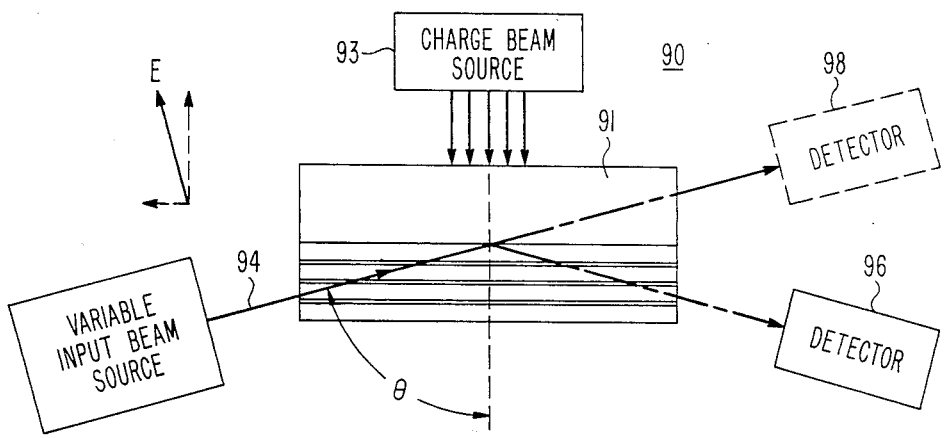
FIG. 9 is a schematic diagram of a further optical device embodying the invention.

Referring now to FIGS. 8 and 9, there are shown other arrangements of nonlinear optical devices using layered semiconductor structures.

In FIG. 8 there is an optical device arrangement 80 including a linear optical material 81 and a layered nonlinear optical material 82 wherein the refractive index $n_o$ of the linear optical material is larger than the zero-intensity input beam refractive index $n_1$ of the layered nonlinear material. Charge is doped into the layers 84 as described with respect to the embodiment of FIG. 1. The monochromatic input beam 83 is applied through the linear optical material to the optical interface at an angle of incidence $\theta$ exceeding the effective critical angle of incidence for high intensity light and smaller than the effective critical angle for low intensity light. For low intensities of the input beam, it is transmitted on through the layered nonlinear material 82 away from a detector 85. As the intensity of the input beam is increased the refractive index of the nonlinear media decreases and the effective critical angle decreases. At a critical intensity the input light beam 83 is totally internally reflected. The evanescent field which exists in the nonlinear material maintains the value of the refractive index $n=n_1+n_2I$ at such a value that the light continues to be reflected. Decreasing the intensity of the input light beam, decreases the evanescent field and increases the refractive index of the nonlinear material so that the input light beam is transmitted again at low intensities.

A characteristic curve similar to the solid curve 71 in FIG. 7 results. The dotted characteristic curve 72 of FIG. 7 applies to the operation of the device 80 in FIG. 8 when the detector is placed in the alternate position of detector 87, shown dotted, in FIG. 8.

In the mentioned system of materials, the device 80 operates effectively in a wavelength range above 0.85 micrometers.

In FIG. 9 there is an optical device arrangement 90 including a linear optical material 91 and a layered nonlinear optical material 92 wherein the refractive index $n_o$ of the linear optical material is less than the zero-intensity input beam refractive index $n_1$ of the layered nonlinear material. Charge is generated in the layers of the layered nonlinear optical material 92 by a charge energizing light beam from a charge beam source 93, as in the arrangement described with respect to FIG. 4. The monochromatic input beam 94 is applied through the layered nonlinear optical material to the interface at an angle of incidence $\theta$ exceeding the critical angle of incidence for low intensity light. The input beam 94 is totally internally reflected to the detector 96 for low intensities of the input beam. For high intensities of the input beam, it is transmitted on through the optical interface and the linear optical material 91. A resulting characteristic curve is similar to the solid curve shown in FIG. 2. The dotted characteristic curve of FIG. 2 applies to the device shown in FIG. 9 when the detector is placed in the alternate position of detector 98, shown dotted in FIG. 9.

Devices operating in accordance with the prior discussion can perform in a wide range of wavelengths. As previously described, devices fabricated in the mentioned material system, provide devices for wavelengths of the input beam larger than 0.85 micrometers and for wavelengths of the charge energizing beam in a range of 0.6–0.9 micrometers.

For devices similar to the devices of FIGS. 1, 4, 8 and 9 but fabricated in other material systems, such as $In_{1-x-y}Ga_xAl_yAs$ and $In_{1-x}Ga_xAs_{1-y}P_y$, the resulting devices can be operated with the wavelength of the input beam larger than 1.3 and 1.5 micrometers, respectively, and with the wavelength of the energizing beam in a range of 1.0–1.5 micrometers. For wavelengths in between the previously described ranges, the materials may be selected from either of the material systems.

In the illustrative embodiments only negative charge has been shown. It is noted that trapped positive charge also will provide useful devices. This trapped positive charge may be provided by doping the layers of the low energy band gap material or by energizing the charge optically.

The foregoing describes several illustrative embodiments of the invention. Other embodiments will be obvious to those skilled in the art. The described embodiments together with those additional embodiments all are considered to be within the scope of the invention.

What is claimed is:

1. An optical device comprising
an optical interface between a linear optical material and a layered semiconductor structure including layers of materials having different energy band gaps, some layers of the structure being arranged for containing trapped charge;
means arranged for applying to the interface, through a path near the critical angle of the interface, an input light beam having a component of an E field polarized normal to the layers; and
means arranged to vary the input light beam for controlling the trapped charge and a dielectric constant of the layered semiconductor structure, thereby changing the direction of the path at the interface.

2. An optical device in accordance with claim 1 wherein
the layered semiconductor structure is a multiple quantum well structure.

3. An optical device in accordance with claim 1 wherein
the controlling means include means for varying a spatial distribution of the trapped charge to change the dielectric constant of the layered semiconductor structure and the direction of the path at the interface.

4. An optical device in accordance with claim 1 wherein
the controlling means include means for varying the density profile of the trapped charge across the thickness of the layers to change the dielectric constant of the layered semiconductor structure and the direction of the path at the interface.

5. An optical device in accordance with claim 1 wherein
the layered semiconductor structure is a superlattice structure.

6. An optical device in accordance with claim 1 wherein
the different energy band gap materials include large energy band gap material layers and small energy band gap material layers, and
the trapped charge is doped into the small energy band gap material layers.

7. An optical device in accordance with claim 1 wherein
the controlling means include means for changing the intensity of the input light beam applied to the layered semiconductor structure.

8. An optical device in accordance with claim 1 wherein
the different energy band gap materials include large energy band gap material layers at least five times as thick as a depth of charge penetration thereinto and small energy band gap material layers, and further comprising
means for energizing optically the charge trapped in the small energy band gap material layers.

9. An optical device in accordance with claim 8 wherein
the layered semiconductor structure is a multiple quantum well structure, and
the controlling means include means for changing the intensity of the input light beam applied to the layered structure and thereby varying a density profile of the trapped charge across the thickness of the small energy band gap material layers to change the dielectric constant of the layered semiconductor structure and the direction of the path at the interface.

10. An optical device comprising
an optical interface between a linear optical material and a layered semiconductor structure including layers of materials having different energy band gaps, some layers of the structure being arranged for containing trapped charge;
means arranged for applying to the interface, through a path near the critical angle of the interface, an input light beam having a component of an E field polarized normal to the layers; and
means arranged to vary the input light beam for controlling the trapped charge and a dielectric constant of the layered structure in a region constrained proximately to the path of the light beam, thereby changing the direction of the path at the interface.

* * * * *